United States Patent
Thomle et al.

(10) Patent No.: US 10,670,288 B2
(45) Date of Patent: *Jun. 2, 2020

(54) DEMAND CONTROL VENTILATION SYSTEM WITH COMMISSIONING AND CHECKOUT SEQUENCE CONTROL

(71) Applicant: Honeywell International Inc., Morris Plains, NJ (US)

(72) Inventors: Adrienne Thomle, Reno, NV (US); Todd Kreft, Richfield, MN (US); Mark Bokusky, Eden Prairie, MN (US)

(73) Assignee: Honeywell International Inc., Morris Plains, NJ (US)

( * ) Notice: Subject to any disclaimer, the term of this patent is extended or adjusted under 35 U.S.C. 154(b) by 141 days.

This patent is subject to a terminal disclaimer.

(21) Appl. No.: 15/706,416

(22) Filed: Sep. 15, 2017

(65) Prior Publication Data

US 2018/0017276 A1    Jan. 18, 2018

Related U.S. Application Data

(63) Continuation of application No. 14/847,823, filed on Sep. 8, 2015, now Pat. No. 9,765,986, which is a
(Continued)

(51) Int. Cl.
*F24F 11/00* (2018.01)
*F24F 12/00* (2006.01)
(Continued)

(52) U.S. Cl.
CPC .............. *F24F 11/30* (2018.01); *F24F 11/62* (2018.01); *F24F 12/006* (2013.01);
(Continued)

(58) Field of Classification Search
CPC .......... F24F 11/30; F24F 11/62; F24F 12/006; F24F 11/52; F24F 2012/007;
(Continued)

(56) References Cited

U.S. PATENT DOCUMENTS 3,979,922 A    9/1976 Shavit
4,182,180 A    1/1980 Mott
(Continued)

FOREIGN PATENT DOCUMENTS

WO    9014556 A1    11/1990
WO    2009061293 A1    5/2009

OTHER PUBLICATIONS

Burr-Brown Products from Texas Instruments, "Voltage Output Programmable Sensor Conditioner PGA 309," 87 pages, Dec. 2003.
(Continued)

*Primary Examiner* — Charles R Kasenge
(74) *Attorney, Agent, or Firm* — Seager Tuft & Wickhem LLP

(57) ABSTRACT

The disclosure relates to a Demand Control Ventilation (DCV) and/or Economizer system that is capable of drawing outside air into an HVAC air stream. In some instances, the DCV and/or Economizer system may be configured to help perform one or more system checks to help verify that the system is functioning properly. In some instances, the DCV and/or Economizer system may provide some level of manual control over certain hardware (e.g. dampers) to help commission the system. The DCV and/or Economizer system may store one or more settings and or parameters used during the commissioning process (either in the factory or in the field), so that these settings and/or parameters may be later accessed to verify that the DCV and/or Economizer system was commissioned and commissioned properly.

20 Claims, 9 Drawing Sheets

Related U.S. Application Data continuation of application No. 12/828,889, filed on Jul. 1, 2010, now Pat. No. 9,255,720, which is a continuation-in-part of application No. 12/764,431, filed on Apr. 21, 2010, now Pat. No. 8,918,218, and a continuation-in-part of application No. 12/764,415, filed on Apr. 21, 2010, now Pat. No. 9,500,382.

(51) Int. Cl.
<br>    *G05B 19/042*     (2006.01)
<br>    *F24F 11/30*     (2018.01)
<br>    *F24F 11/62*     (2018.01)
<br>    *F24F 11/52*     (2018.01)

(52) U.S. Cl.
<br>    CPC ............ *G05B 19/042* (2013.01); *F24F 11/52* (2018.01); *F24F 2011/0006* (2013.01); *F24F 2012/007* (2013.01); *G05B 2219/23193* (2013.01); *G05B 2219/2614* (2013.01); *Y02B 30/563* (2013.01)

(58) Field of Classification Search
<br>    CPC ........... F24F 2011/0006; G05B 19/042; G05B 2219/2614; G05B 2219/23193; Y02B 30/563
<br>    See application file for complete search history.

(56) References Cited

U.S. PATENT DOCUMENTS

| | | | |
|---|---|---|---|
| 4,267,967 A | 5/1981 | Beck et al. | |
| 4,347,712 A | 9/1982 | Benton et al. | |
| 4,379,484 A | 4/1983 | Lom et al. | |
| 4,389,853 A | 6/1983 | Hile | |
| 4,415,896 A | 11/1983 | Allgood | |
| 4,423,364 A | 12/1983 | Kompelien et al. | |
| 4,495,986 A | 1/1985 | Clark et al. | |
| 4,497,031 A | 1/1985 | Froehling et al. | |
| 4,543,796 A | 10/1985 | Han et al. | |
| 4,570,448 A | 2/1986 | Smith | |
| 4,580,620 A | 4/1986 | Fukumoto et al. | |
| 4,591,093 A | 5/1986 | Elliott, Jr. | |
| 4,605,160 A | 8/1986 | Day | |
| 4,646,964 A | 3/1987 | Parker et al. | |
| 4,795,088 A * | 1/1989 | Kobayashi | F24F 11/30 236/49.3 |
| 4,838,484 A | 6/1989 | Kreuter | |
| 4,843,084 A | 6/1989 | Parker et al. | |
| 4,884,214 A | 11/1989 | Parker et al. | |
| 4,931,948 A | 6/1990 | Parker et al. | |
| 4,933,633 A | 6/1990 | Allgood | |
| 4,948,040 A * | 8/1990 | Kobayashi | F24F 11/0009 165/217 |
| 5,103,391 A | 4/1992 | Barrett | |
| 5,165,465 A | 11/1992 | Kenet | |
| 5,276,630 A | 1/1994 | Baldwin et al. | |
| 5,292,280 A | 3/1994 | Janu et al. | |
| 5,311,451 A | 5/1994 | Barrett | |
| 5,385,297 A | 1/1995 | Rein et al. | |
| 5,390,206 A | 2/1995 | Rein et al. | |
| 5,418,131 A | 5/1995 | Butts | |
| 5,446,677 A | 8/1995 | Jensen et al. | |
| 5,535,814 A | 7/1996 | Hartman | |
| 5,564,626 A | 10/1996 | Kettler et al. | |
| 5,590,830 A | 1/1997 | Kettler et al. | |
| 5,597,354 A | 1/1997 | Janu et al. | |
| 5,602,758 A | 2/1997 | Lincoln et al. | |
| 5,605,280 A | 2/1997 | Hartman | |
| 5,706,190 A | 1/1998 | Russ et al. | |
| 5,719,408 A | 2/1998 | Yamamoto et al. | |
| 5,762,420 A | 6/1998 | Mills | |
| 5,772,501 A | 6/1998 | Merry et al. | |
| 5,791,408 A | 8/1998 | Seem | |
| 5,801,940 A | 9/1998 | Russ et al. | |
| 5,874,736 A | 2/1999 | Pompei | |
| 5,970,430 A | 10/1999 | Burns et al. | |
| 6,006,142 A | 12/1999 | Seem et al. | |
| 6,026,352 A | 2/2000 | Burns et al. | |
| 6,125,540 A | 10/2000 | Court et al. | |
| 6,126,540 A | 10/2000 | Janu et al. | |
| 6,161,764 A | 12/2000 | Jatnieks | |
| 6,223,544 B1 * | 5/2001 | Seem | F24F 11/30 62/127 |
| 6,249,100 B1 | 6/2001 | Lange | |
| 6,250,382 B1 | 6/2001 | Rayburn et al. | |
| 6,415,617 B1 | 7/2002 | Seem | |
| 6,488,081 B2 | 12/2002 | Rayburn et al. | |
| 6,491,094 B2 | 12/2002 | Rayburn et al. | |
| 6,514,138 B2 | 2/2003 | Estepp | |
| 6,578,770 B1 | 6/2003 | Rosen | |
| 6,581,847 B2 | 6/2003 | Kline et al. | |
| 6,609,967 B2 | 8/2003 | Sharp et al. | |
| 6,629,886 B1 | 10/2003 | Estepp | |
| 6,634,422 B2 | 10/2003 | Rayburn et al. | |
| 6,640,162 B1 | 10/2003 | Swanson | |
| 6,756,998 B1 | 6/2004 | Bilger | |
| 6,778,945 B2 | 8/2004 | Chassin et al. | |
| 6,792,767 B1 | 9/2004 | Pargeter et al. | |
| 6,826,920 B2 | 12/2004 | Wacker | |
| 6,851,621 B1 | 2/2005 | Wacker et al. | |
| 6,916,239 B2 | 7/2005 | Siddaramanna et al. | |
| 6,967,565 B2 * | 11/2005 | Lingemann | G05B 15/02 340/12.23 |
| 6,988,671 B2 | 1/2006 | DeLuca | |
| 7,036,559 B2 | 5/2006 | Stanimirovic | |
| 7,044,397 B2 | 5/2006 | Bartlett et al. | |
| 7,055,759 B2 | 6/2006 | Wacker et al. | |
| 7,059,536 B2 | 6/2006 | Schneider et al. | |
| 7,099,748 B2 | 8/2006 | Rayburn | |
| 7,104,460 B2 | 9/2006 | Masen et al. | |
| 7,106,460 B2 | 9/2006 | Haines et al. | |
| 7,114,554 B2 | 10/2006 | Bergman et al. | |
| 7,177,776 B2 | 2/2007 | Whitehead | |
| 7,222,800 B2 | 5/2007 | Wruck | |
| 7,258,280 B2 | 8/2007 | Wolfson | |
| 7,331,852 B2 | 2/2008 | Ezell et al. | |
| 7,378,954 B2 | 5/2008 | Wendt | |
| 7,398,821 B2 | 7/2008 | Rainer et al. | |
| 7,475,828 B2 | 1/2009 | Bartlett et al. | |
| 7,484,668 B1 | 2/2009 | Eiler | |
| 7,525,787 B2 | 4/2009 | Dhindsa et al. | |
| 7,546,200 B2 | 6/2009 | Justice | |
| 7,558,648 B2 | 7/2009 | Hoglund et al. | |
| 7,565,225 B2 | 7/2009 | Dushane et al. | |
| 7,574,871 B2 | 8/2009 | Bloemer et al. | |
| 7,632,178 B2 | 12/2009 | Meneely, Jr. | |
| 7,641,126 B2 | 1/2010 | Schultz et al. | |
| 7,693,583 B2 | 4/2010 | Wolff et al. | |
| 7,758,407 B2 | 7/2010 | Ahmed | |
| 7,797,080 B2 | 9/2010 | Durham, III | |
| 7,827,813 B2 | 11/2010 | Seem | |
| 7,841,194 B2 * | 11/2010 | Ishida | F24F 3/1411 62/176.6 |
| 7,891,573 B2 | 2/2011 | Finkam et al. | |
| 7,904,830 B2 | 3/2011 | Hoglund et al. | |
| 7,913,180 B2 | 3/2011 | Hoglund et al. | |
| 7,935,729 B2 | 5/2011 | Harbige et al. | |
| 7,979,163 B2 | 7/2011 | Terlson et al. | |
| 7,987,680 B2 | 8/2011 | Hamada et al. | |
| 7,992,630 B2 | 8/2011 | Springer et al. | |
| 8,027,742 B2 | 9/2011 | Seem et al. | |
| 8,066,558 B2 | 11/2011 | Thomle et al. | |
| 8,147,302 B2 | 4/2012 | Desrochers et al. | |
| 8,185,244 B2 | 5/2012 | Wolfson | |
| 8,200,344 B2 | 6/2012 | Li et al. | |
| 8,200,345 B2 | 6/2012 | Li et al. | |
| 8,219,249 B2 | 7/2012 | Harrod et al. | |
| 8,239,168 B2 | 8/2012 | House et al. | |
| 8,326,464 B2 | 12/2012 | Clanin | |
| 8,412,654 B2 | 4/2013 | Montalvo | |
| 8,433,446 B2 | 4/2013 | Grohman et al. | |
| 8,515,584 B2 | 8/2013 | Miller et al. | |
| 8,583,289 B2 | 11/2013 | Stack et al. | |

(56) References Cited

U.S. PATENT DOCUMENTS

| | | | |
|---|---|---|---|
| 8,688,278 | B2 | 4/2014 | Kreft et al. |
| 8,719,385 | B2 | 5/2014 | Nair et al. |
| 8,719,720 | B2 | 5/2014 | Grabinger et al. |
| 8,943,848 | B2 | 2/2015 | Phannavong et al. |
| 9,255,720 | B2* | 2/2016 | Thomle ............... F24F 12/006 |
| 9,285,134 | B2 | 3/2016 | Bray et al. |
| 9,703,299 | B2 | 7/2017 | Grabinger et al. |
| 9,765,986 | B2* | 9/2017 | Thomle ............... F24F 12/006 |
| 2001/0010265 | A1 | 8/2001 | Rayburn et al. |
| 2001/0010266 | A1 | 8/2001 | Rayburn et al. |
| 2001/0030609 | A1 | 10/2001 | Sen et al. |
| 2002/0090908 | A1 | 7/2002 | Estepp |
| 2003/0110001 | A1 | 6/2003 | Chassin et al. |
| 2003/0181158 | A1 | 9/2003 | Schell et al. |
| 2004/0249597 | A1 | 12/2004 | Whitehead |
| 2004/0267385 | A1* | 12/2004 | Lingemann ............ G05B 15/02 700/83 |
| 2005/0125083 | A1 | 6/2005 | Kiko |
| 2006/0004492 | A1 | 1/2006 | Terlson et al. |
| 2006/0009862 | A1 | 1/2006 | Imhof et al. |
| 2006/0107670 | A1 | 5/2006 | Thomle et al. |
| 2006/0117769 | A1 | 6/2006 | Helt et al. |
| 2006/0118646 | A1 | 6/2006 | Masen et al. |
| 2006/0130502 | A1 | 6/2006 | Wruck et al. |
| 2007/0023533 | A1 | 2/2007 | Liu |
| 2007/0037507 | A1 | 2/2007 | Liu |
| 2007/0079619 | A1 | 4/2007 | Hamada et al. |
| 2007/0084938 | A1 | 4/2007 | Liu |
| 2007/0144189 | A1* | 6/2007 | Ishida ................ F24F 3/1429 62/157 |
| 2007/0227721 | A1 | 10/2007 | Springer et al. |
| 2007/0289322 | A1 | 12/2007 | Mathews |
| 2008/0128523 | A1 | 6/2008 | Hoglund et al. |
| 2008/0176503 | A1 | 7/2008 | Stanimirovic |
| 2008/0179408 | A1 | 7/2008 | Seem |
| 2009/0083583 | A1 | 3/2009 | Seem et al. |
| 2009/0143915 | A1 | 6/2009 | Dougan et al. |
| 2009/0158188 | A1 | 6/2009 | Bray et al. |
| 2010/0070907 | A1 | 3/2010 | Harrod et al. |
| 2010/0105311 | A1 | 4/2010 | Meneely, Jr. |
| 2010/0106308 | A1 | 4/2010 | Filbeck et al. |
| 2010/0106333 | A1 | 4/2010 | Grohman et al. |
| 2010/0106334 | A1 | 4/2010 | Grohman et al. |
| 2010/0106543 | A1 | 4/2010 | Marti |
| 2010/0198411 | A1 | 8/2010 | Wolfson |
| 2011/0010621 | A1 | 1/2011 | Wallaert et al. |
| 2011/0093493 | A1 | 4/2011 | Nair et al. |
| 2011/0097988 | A1 | 4/2011 | Lord |
| 2011/0113360 | A1 | 5/2011 | Johnson et al. |
| 2011/0172831 | A1 | 7/2011 | Kreft et al. |
| 2011/0202180 | A1 | 8/2011 | Kowald et al. |
| 2011/0264273 | A1 | 10/2011 | Grabinger et al. |
| 2011/0264275 | A1 | 10/2011 | Thomle et al. |
| 2011/0264280 | A1 | 10/2011 | Grabinger et al. |
| 2011/0308265 | A1 | 12/2011 | Phannavong et al. |
| 2012/0078563 | A1 | 3/2012 | Grabinger et al. |
| 2014/0309791 | A1 | 10/2014 | Grabinger et al. |
| 2016/0116177 | A1* | 4/2016 | Sikora .................. F24F 11/30 165/11.2 |

OTHER PUBLICATIONS

California Energy Commission, "2008 Building Energy Efficient Standards for Residential and Nonresidential Buildings," 176 pages, Dec. 2008.

California Energy Commission, "Reference Appendices for the 2008 Building Energy Efficient Standards for Residential and Non-residential Buildings," 363 pages, Dec. 2008, revised Jun. 2009.

Carrier Corporation, "Getting More for Less, How Demand Controlled Ventilation Increases Air Quality and Reduces Costs," 7 pages, Dec. 1998.

FEMP, "Demand-Controlled Ventilation Using $CO_2$ Sensors," Federal Technology Alert, A New Technology Demonstration Publication, 28 pages, Mar. 2004.

Honeywell, "Building Control Systems, Use of Demand Control Ventilation in Your HVAC System," 1 page, Nov. 2005.

Honeywell, "Product Information Sheet," pp. 134-135, prior to Sep. 24, 2010.

Honeywell, "W6210A,D and W7210A,D Solid State Economizer Logic Module," Product Data, 24 pages, prior to Sep. 24, 2010.

Honeywell, "W7212, W7213, W7214 Economizer Logic Modules for Ventilation Control," Product Data, 16 pages, 2004.

Honeywell, "W7212, W7213, W7214 Economizer Logic Modules for Ventilation Control," Product Data, 24 pages, revised Mar. 2010.

Honeywell, Fresh Air Economizer.TM. Systems, 2 pages, 1999.

http://content.honeywell.com/building/components/pr/econstudy.asp., "Honeywell Hvac—Economizer Study," 3 pages, printed Oct. 21, 2004.

http://www.automatedbuildings.com/releases/mar09/090312111454honeywell.htm- , "Honeywell Introduces Economizer Savings Tool and Selectable Dry Bulb Temperature Sensor to Reduce Energy Consumption," 2 pages, Mar. 2009.

http://www.colemparmer.com/Assets/manual, "Digi-Sense Humidity Meter Model No. 60020-40, 68X309920 Rev. 0," OakTon BlueTech Instruments, 28 pages, Jun. 2004.

http://www.nmschembio.org.uk/dm.sub.-uk/documents/lgcvam2003032.sub.--xsj- gl.pdf, "Preparation of Calibration Curves, A Guide to Best Practice," LGC/VAM2003/032, 30 pages, Sep. 2003.

http://www.pexsupply.com/Honeywell-W7210A1001-Series-72-Economizer-TwoSPDT . . . , "Series-72-Economizer-TwoSPDT One 2-10VDC," SKU: W7210A1001, 2 pages, printed Sep. 7, 2010.

http://www.ti.com/lit/an/sboa111/sboa111.pdf, "A Practical Technique for Minimizing the Number of Measurements in Sensor Signal Conditioning Calibration," Texas Instruments, Application Report SBOA111, pp. 1-9, Jun. 2005.

Kingrey et al., "Checking Economizer Operation," Washington State University Extension Energy Program, 3 pages, Feb. 6, 2009.

New Buildings Institute, "Commercial Rooftop HVAC Energy Savings Research Program, Draft(A) Final Project Report," 99 pages, Mar. 25, 2009.

PurpleSwift, "DC6 AHU Economizer Unit," 2 pages, downloaded Jul. 1, 2010.

Rooftop Systems, Inc., "Economizer Catalog, Version 1.1," 20 pages, downloaded Jul. 1, 2010.

Taylor, "Comparing Economizer Relief Systems," ASHRAE Journal, pp. 33-42, Sep. 2000.

\* cited by examiner

DEMAND CONTROL VENTILATION SYSTEM WITH COMMISSIONING AND CHECKOUT SEQUENCE CONTROL

This application is a continuation of co-pending U.S. patent application Ser. No. 14/847,823, filed Sep. 8, 2015, and entitled "DEMAND CONTROL VENTILATION SYSTEM WITH COMMISSIONING AND CHECKOUT SEQUENCE CONTROL" which is a continuation of U.S. patent application Ser. No. 12/828,889, filed Jul. 1, 2010, and entitled "DEMAND CONTROL VENTILATION SYSTEM WITH COMMISSIONING AND CHECKOUT SEQUENCE CONTROL", now U.S. Pat. No. 9,255,720, issued Feb. 9, 2016, which is (1) a Continuation-In-Part (CIP) of U.S. patent application Ser. No. 12/764,431, filed Apr. 21, 2010, and entitled "DEMAND CONTROL VENTILATION SYSTEM WITH REMOTE MONITORING", now U.S. Pat. No. 8,918,218, issued Dec. 23, 2014; and (2) is a Continuation-In-Part (CIP) of U.S. patent application Ser. No. 12/764,415, filed Apr. 21, 2010, and entitled "AUTOMATIC CALIBRATION OF A DEMAND CONTROL VENTILATION SYSTEM", now U.S. Pat. No. 9,500,382, issued Nov. 22, 2016, all of which are incorporated herein by reference.

TECHNICAL FIELD

The disclosure relates generally to Heating, Ventilation, and Air Conditioning (HVAC) systems for conditioning the air of an inside space of a building or other structure, and more particularly, to economizer and/or demand control ventilation systems.

BACKGROUND

Most modern buildings use some sort of an HVAC system to control the environment conditions inside of the building. Such HVAC systems can be configured to control a number of different environmental conditions including, for example, temperature, humidity, air quality and/or other environmental conditions, as desired. In many HVAC systems, air from the building's inside space is drawn into return ducts and provided back to the HVAC system, where the return air is conditioned and provided back to the inside space. To meet desired ventilation requirements, some HVAC systems include demand control ventilation systems (DCV). Such systems often include an exhaust port for exhausting at least some of the return air to the outside environment, and/or an intake port for bringing fresh air into the HVAC system. In some instances, a damper system is provided to control how much return air is exhausted and/or how much outside air is brought into the building. In many instances, the air supplied by the HVAC system to the inside space can be a mixture of fresh outside air and return air, depending on the conditions.

In some cases, the exhaust and/or intake port can be part of an economizer unit, which in some instances can help provide the demand control ventilation function. That is, in addition to providing a desired level of ventilation to the building, such an economizer may, under certain conditions, act as a first stage of cooling to help decrease energy usage of the HVAC system. In one example, the economizer may draw in cooler outside air to provide essentially "free" cooling during some cooling cycles. Certain dampers, sensors, fans and/or other hardware are often used to provide this functionality.

In many cases, such economizer and/or DCV systems are not properly setup or calibrated during the commissioning process, or are never commissioned at all. In some cases, the commissioning process can be a relatively complicated and time consuming process for a typical installation technician, and therefore, the commissioning process is not always done or done correctly. It would be desirable, therefore, to provide a economizer and/or DCV system that is easier to commission and/or easier to verify that commissioning was properly performed.

SUMMARY

The disclosure relates generally to Heating, Ventilation, and Air Conditioning (HVAC) systems for conditioning the air of an inside space of a building or other structure, and more particularly, to economizer and/or demand control ventilation systems that are capable of drawing outside air into an HVAC air stream. In some instances, the DCV and/or Economizer system may be configured to help perform one or more system checks to help verify that the system is functioning properly. In some instances, the DCV and/or Economizer system may provide some level of manual control over certain hardware (e.g. dampers) to help commission the system. The DCV and/or Economizer system may store one or more settings and or parameters used during the commissioning process (either in the factory or in the field), so that these settings and/or parameters may be later accessed to verify that the DCV and/or Economizer system was commissioned and commissioned properly.

The above summary is not intended to describe each disclosed embodiment or every implementation of the invention.

BRIEF DESCRIPTION OF THE DRAWINGS

The following description should be read with reference to the drawings. The drawings, which are not necessarily to scale, depict selected illustrative embodiments and are not intended to limit the scope of the disclosure. The disclosure may be more completely understood in consideration of the following description of various illustrative embodiments in connection with the accompanying drawings, in which.

Figure 1:
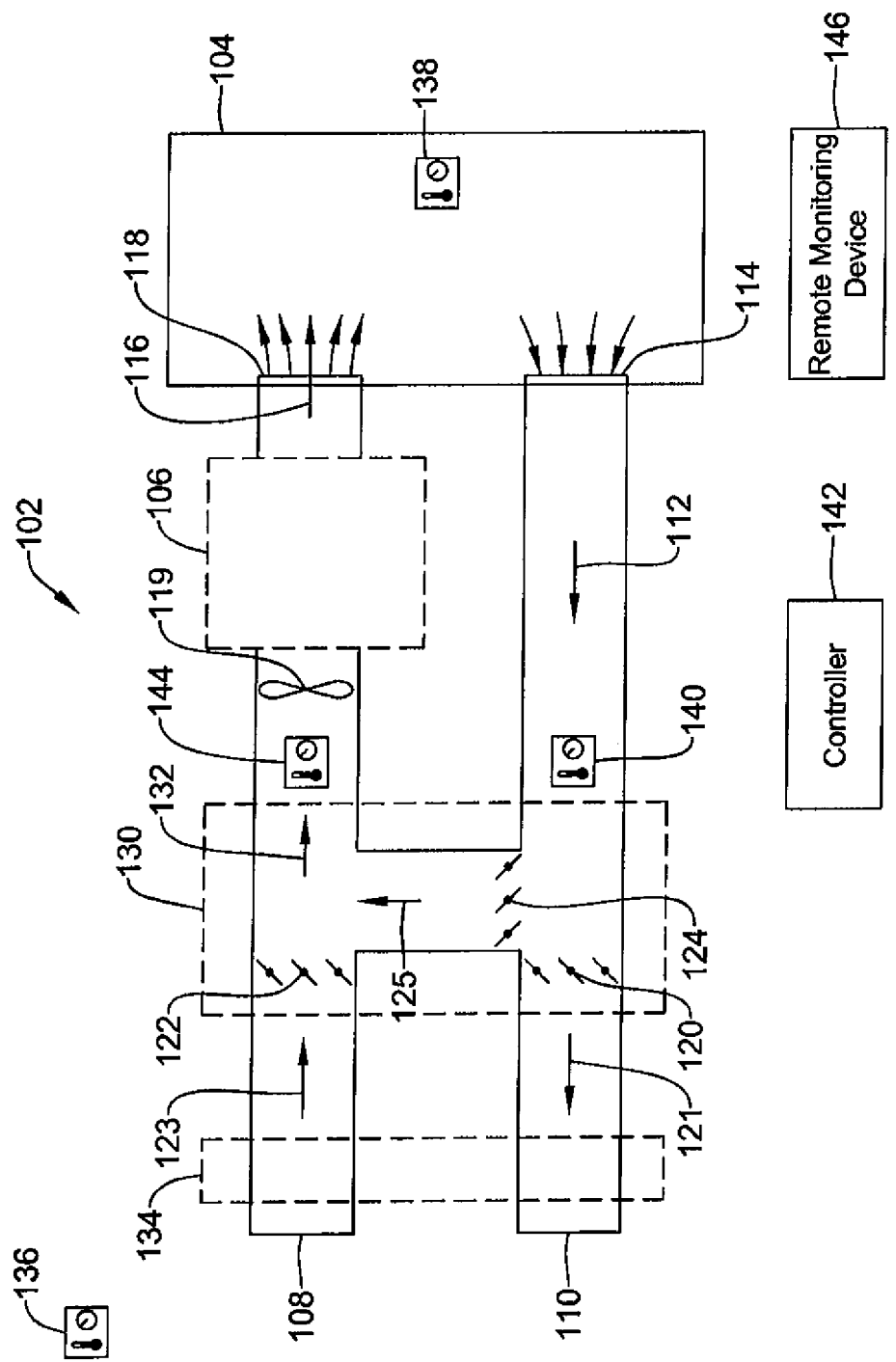
FIG. 1 is a schematic diagram showing an illustrative HVAC system of a building including an economizer/demand control ventilation (DCV) system.

While the invention is amenable to various modifications and alternative forms, specifics thereof have been shown by way of example in the drawings and will be described in detail. It should be understood, however, that the intention is not to limit aspects of the invention to the particular embodiments described. On the contrary, the intention is to cover all modifications, equivalents, and alternatives falling within the spirit and scope of the invention.

DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

FIG. 1 is a schematic diagram showing an illustrative Heating, Ventilation, and Air Conditioning (HVAC) system 102 of a building 104. The HVAC system 102 may include a Demand Control Ventilation (DCV) and/or Economizer system 130. The building 104 may be a residential, commercial, or any other suitable building. The HVAC system 102 may include an HVAC unit 106, which in some cases may include one or more heating and/or cooling units. In some embodiments, the HVAC unit(s) 106 may be positioned on a rooftop (as in some commercial buildings) whereas in other embodiments, the HVAC unit(s) may be located within the building. In the illustrative embodiment shown, the HVAC system 102 includes an DCV and/or Economizer 130 upstream of the HVAC unit 106. The DCV and/or Economizer 130 may include an outside air intake 108 and/or an exhaust vent 110. A return air stream 112 is shown for drawing return air from the inside space of the building 104 through one or more return registers 114. The illustrative HVAC system 102 includes a fan 119, which may be a multiple or infinite speed fan, which can be controlled to induce an air flow through the HVAC unit 106 and to the building 104 as shown at 116 through one or more supply registers 118. In some cases, the DCV and/or Economizer 130 may include its own fan.

As shown, the DCV and/or Economizer system 130 of the HVAC system 102 may employ one or more dampers within the various ducts of the DCV and/or Economizer system 130 to control air flows. In some instances, these dampers may include an exhaust damper 120 to regulate the fraction of the return air stream 112 that is exhausted 121 from the building 104, an intake damper 122 to regulate the flow of an incoming outside air stream 123 into the building 104, and/or a return damper 124 to regulate the flow of the retained return air stream 125 to mix with the incoming outside air stream 123. In some cases, the dampers 120, 122, and/or 124 may be mechanically coupled together to open and close in a coordinated manner, but this is not required. For example, in some illustrative embodiments, dampers 120 and 122 may open and close together or in sequence, and damper 124 may open and close in an opposite manner to dampers 120 and 122. When so provided, when damper 122 is opened to allow more of the outside air stream 123 into the building 104, damper 120 may also open to allow a similar amount of the return air stream 112 to be exhausted 121 from the building 104. The return air damper 124 may close as the dampers 120 and 122 open. This arrangement may help balance the pressure inside the HVAC system 102 and building 104. In some illustrative embodiments, more or fewer of the dampers 120, 122, and 124 may be employed, but the teachings of this disclosure may be applied advantageously to any suitable HVAC system.

In some embodiments, the Demand control ventilation (DCV) system, including the dampers 120, 122, 124 and/or associated duct work, may be included in an economizer unit, but this is not required. Under some conditions, such an economizer unit may be used to provide a first stage of free cooling by mixing cooler incoming outside air 123 with the sometimes warmer retained return air 125 to provide a cooler mixed air stream 132 to the cooling coils of the HVAC unit 106. Note that in the present disclosure, "return air" may refer to the return air stream 112, before it has been (possibly) divided into an exhaust air stream 121 and a retained return air stream 125, and in other cases, "return air" or "return air stream" may refer to the retained return air stream, regardless of whether the retained return air stream includes the entire return air stream 112 or only a fraction thereof. It generally will be clear from context what "return air" refers to, and in the case of referring to the contribution of inside air to the mixed air stream 132, it generally is to be understood that the retained return air stream 125, which originates from the return air stream 112, may be referred to as "return air."

In some instances, the HVAC system 102 may include a heat exchanger generally shown at 134 to transfer heat energy between the incoming outside air stream 123 and the exhausted air stream 121, which may be useful under some operating conditions.

Decisions for when and how to use the DCV and/or Economizer 130 may depend on strategies that consider current and/or past conditions of outside air and/or indoor air. In some instances, the HVAC system 102 of FIG. 1 may include one or more outdoor air sensors 136 for measuring one or more parameters of the outside air. Current economizer strategies are typically based on dry bulb temperature, enthalpy, a combination of the two, or a sensed enthalpy that approximates the two. These strategies generally base a decision to economize (e.g., whether to draw in outside air in amounts greater than those needed to meet Demand Control Ventilation requirements) on the outside air temperature or enthalpy and whether there is a need to cool the inside space of the building 104.

The HVAC system of FIG. 1 may include one or more inside air sensors 138 for measuring one or more parameters of the air of the inside space of the building 104. Alternatively, or in addition, one or more return air stream sensors 140 may be provided to measure parameters of the air of the inside space, given that the return air stream 112 is drawn from the inside space of the building 104. In some cases, a mixed air sensor 144 may be provided. Any of inside 138, return 140, mixed 114, and outside 136 sensors may be configured to determine one or more air parameters of interest, such as dry bulb temperature, wet bulb temperature, dew point (i.e., dew point temperature), relative humidity, and/or enthalpy (i.e., specific enthalpy), to name a few. Notably, these air parameters are not all independent. With appropriate assumptions (e.g., ideal gases, etc.), their interrelationship may be expressed through psychrometric equations and represented graphically, for example on a psychrometric chart, or numerically as desired. Some desired air parameters may be obtained from measurements of two other appropriately chosen air parameters. For example, dew point and/or enthalpy may be calculated from measured values of dry bulb temperature and relative humidity. In some illustrative embodiments, any of inside 138, return 140, mixed 114, and/or outside 136 sensors may be configured to measure or determine two or more air parameters selected from a set of parameters such as dry bulb temperature, dew point, relative humidity, and/or enthalpy.

A controller, such as controller 142, may be provided to control the HVAC system 102. Controller 142 may be any suitable controller. Controller 142 may be a controller for the entire HVAC system 102, or any appropriate subset or subsets of the HVAC system 102 such as the DCV and/or Economizer 130. Physically, it may be a stand-alone unit or units, or it may be integrated with hardware, such as with DCV and/or Economizer 130. Controller 142 may be configured to receive information from any suitable source, such as the inside 138, return 140, mixed 144, and/or outside 136 sensors, and it may be configured to issue commands to any appropriate component of the HVAC system 102, such as dampers 120, 122, 124, fan 119, HVAC unit 106, etc. It is contemplated that controller 142 may be configured and programmed in any suitable manner.

In the event that controller 142 is integrated with hardware or located, for instance with a rooftop unit, it may difficult to determine if the HVAC system 102 and/or DCV and/or Economizer 130 is functioning properly without physically visiting the controller 142. In some instances, a remote monitoring device, such as remote monitoring device 146, may be provided to allow the building owner and/or building occupant to monitor the HVAC system 102 and/or DCV/Economizer 130 without physically visiting the controller 142 or the HVAC unit(s) 106. It is contemplated that in some embodiments, remote monitoring device 146 may be located within building 104, or other location which allows for convenient access to the remote monitoring device 146. In some instances, the remote monitoring device 146 may provide alerts and system faults in real time to the user. In some embodiments, remote monitoring device 146 may allow remote configuration of the HVAC system 102 and/or DCV/Economizer 130 in order to change control points or other parameters without physically visiting the system 102 as discussed in more detail with respect to FIGS. 2, 3A and 3B. In some embodiments, the controller 142 itself may be located within building 104, or other location which allows for convenient access to the controller 142, but this is not required or even desired in all embodiments. This may, however, reduce the need for a separate remote monitoring device 146.

Figure 2:
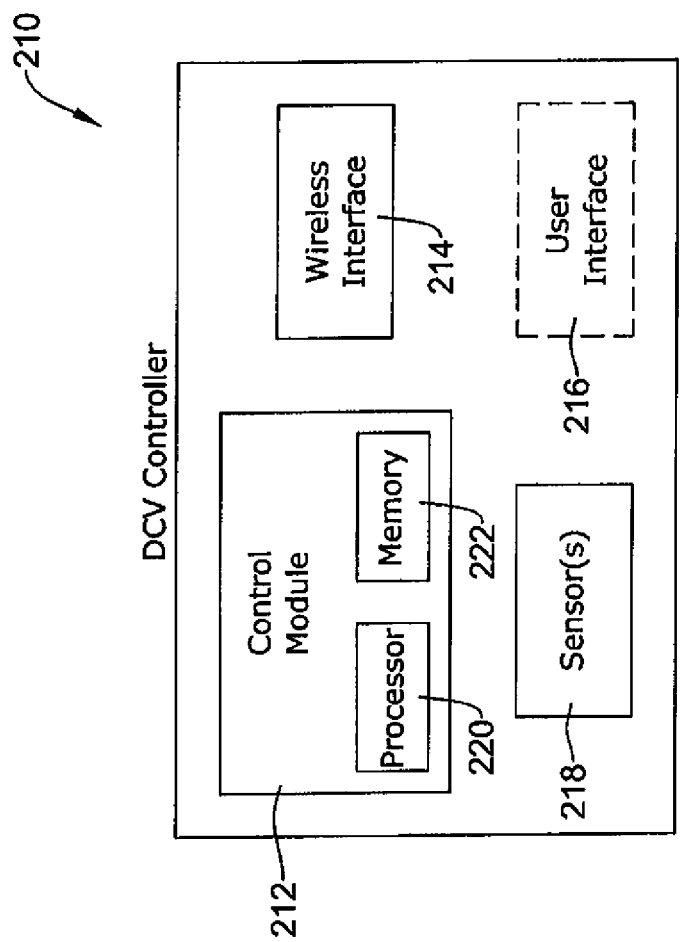
FIG. 2 is block diagram of an illustrative demand control ventilation (DCV) and/or economizer controller.

FIG. 2 is a block diagram of an illustrative DCV and/or Economizer controller 210, which may be used in conjunction with the HVAC system of FIG. 1. While controller 210 may be described as DCV and/or Economizer controller 210, it should be understood the DCV control system and/or economizer system may function independently of one another and may function on separate control loops, if both are present. Further, while the HVAC system 102 may be described as having an economizing function and demand control ventilation capabilities, it should be understood that one may be present without the other. In the illustrative embodiment, the controller 210 may include a control module 212, a wireless interface 214, an optional user interface 216, and one or more sensors 218. However, this is just one example of a suitable controller. In some cases, the one or more sensors 218 may include a temperature sensor, a humidity sensor, a ventilation sensor, an air quality sensor (e.g. $CO_2$ sensors), and/or any other suitable HVAC building control system sensor, as desired. Temperature sensor(s) may be provided to sense the indoor, outdoor temperatures and/or mixed air temperatures. Likewise, humidity sensor may be provided to sense the humidity of the indoor, outdoor and/or mixed air. As illustrated, the one or more sensors 218 may be included with the Controller 210, such as within a housing of Controller 210. However, it is contemplated that one or more sensors 218 may be located remote from the Controller 210, but in communication therewith, if desired.

Control module 212 of the illustrative Controller 210 may be configured to help control the comfort level (i.e. heating, cooling, ventilation, and/or air quality, etc.) of at least a portion of the building or structure 104 by controlling one or more dampers 120, 122, 124 and/or activating one or more HVAC components 106, as illustrative in FIG. 1. In some instances, control module 212 may include a processor 220 and a memory 222. Control module 212 may be configured to control and/or set one or more HVAC functions, such as, for example, HVAC schedules, temperature setpoints, humidity setpoints, trend logs, timers, fan speeds, damper positions, environment sensing, and/or other HVAC functions or programs, as desired. In some cases, control module 212 may be used to configure one or more settings of the HVAC controller, such as, for example, HVAC controller schedules including ventilation schedules, temperature setpoints, humidity setpoints, trend logs, timers, fan speeds, damper positions, environment sensing, HVAC controller programs, user preferences, and/or other HVAC controller settings, as desired. In the illustrative embodiment, control module 212 may help control the comfort level of at least a portion of the building or structure using the temperature sensed by temperature sensor of the one or more sensors 218, when provided.

A memory 222 may be used to store any desired information, such as the aforementioned HVAC schedules, temperature setpoints, humidity setpoints, trend logs, timers, fan speeds, damper positions, environmental settings, and any other settings and/or information as desired. Control module 12 may store information within memory 222 and may subsequently retrieve the stored information. Memory 222 may include any suitable type of memory, such as, for example, random-access memory (RAM), read-only member (ROM), electrically erasable programmable read-only memory (EEPROM), Flash memory, or any other suitable memory, as desired. In some instances, memory 222 may store one or more control programs for execution by the processor 220.

When present, wireless interface 214 of the Controller 210 may be configured to wirelessly communicate (i.e. transmit and/or receive signals) with a wireless interface of one or more HVAC controllers (and/or HVAC components 106). For example, wireless interface 214 may be configured to communicate with a wireless interface of an HVAC controller and send and/or receive signals corresponding to, for example, a temperature sensed by temperature sensor, a humidity sensed by the humidity sensor, heat and/or cool set points, ventilation settings, indoor and/or outdoor air temperatures, equipment status, scheduling, trend logs, and/or any other suitable information and/or data. It is contemplated that the wireless interface 214 may include, for example, a radio frequency (RF) wireless interface, an infrared wireless interface, a microwave wireless interface, an optical interface, and/or any other suitable wireless interface, as desired. While a wireless interface 214 is shown in FIG. 2, it is contemplated that a wired interface may be used instead, or in addition to, the wireless interface 214.

The optional user interface 216 may be any suitable interface that is configured to display and/or solicit information as well as permit a user to enter data and/or other settings, as desired. In some cases, user interface 216 may allow a user or technician to program and/or modify one or more control parameters of Controller 210, such as programming a set point, a time, an equipment status and/or parameter, as desired. In some instances, the user interface 216 may include a touch screen, a liquid crystal display (LCD) panel and keypad, a dot matrix display, a computer, buttons, one or more LED's and/or any other suitable interface, as desired. In one example, at least some of the parameters and/or settings may be transmitted to the Controller 210 via wireless interface 214, but this is not required or even desired in all embodiments. In some instances, user interface 216 may be configured to alert the user to system faults occurring in the system using, for example, audio and/or visual alerts. In some cases, Controller 210 may only control the DCV and/or Economizer system, and not the HVAC system more generally.

In some embodiments, the HVAC system 102, such as illustrated in FIG. 1, may include a Controller 210 that is programmed to control ventilation to the building 104 based on actual occupancy using carbon dioxide ($CO_2$) sensors. Alternatively, or in addition, Controller 210 may be programmed to control ventilation to the building 104 based on a ventilation schedule, or a combination of actual occupancy and a ventilation schedule. In either case, it contemplated that controller 210 may allow the ventilation rate to vary based on actual or scheduled occupancy, rather than requiring a maximum ventilation rate at all occupied times. Because buildings are rarely, if ever, at maximum occupancy at all times, Controller 210 may, if desired, provide substantial energy and/or cost savings by not requiring the ventilation rate to be at the maximum ventilation rate during all occupied time periods.

Figure 3A:
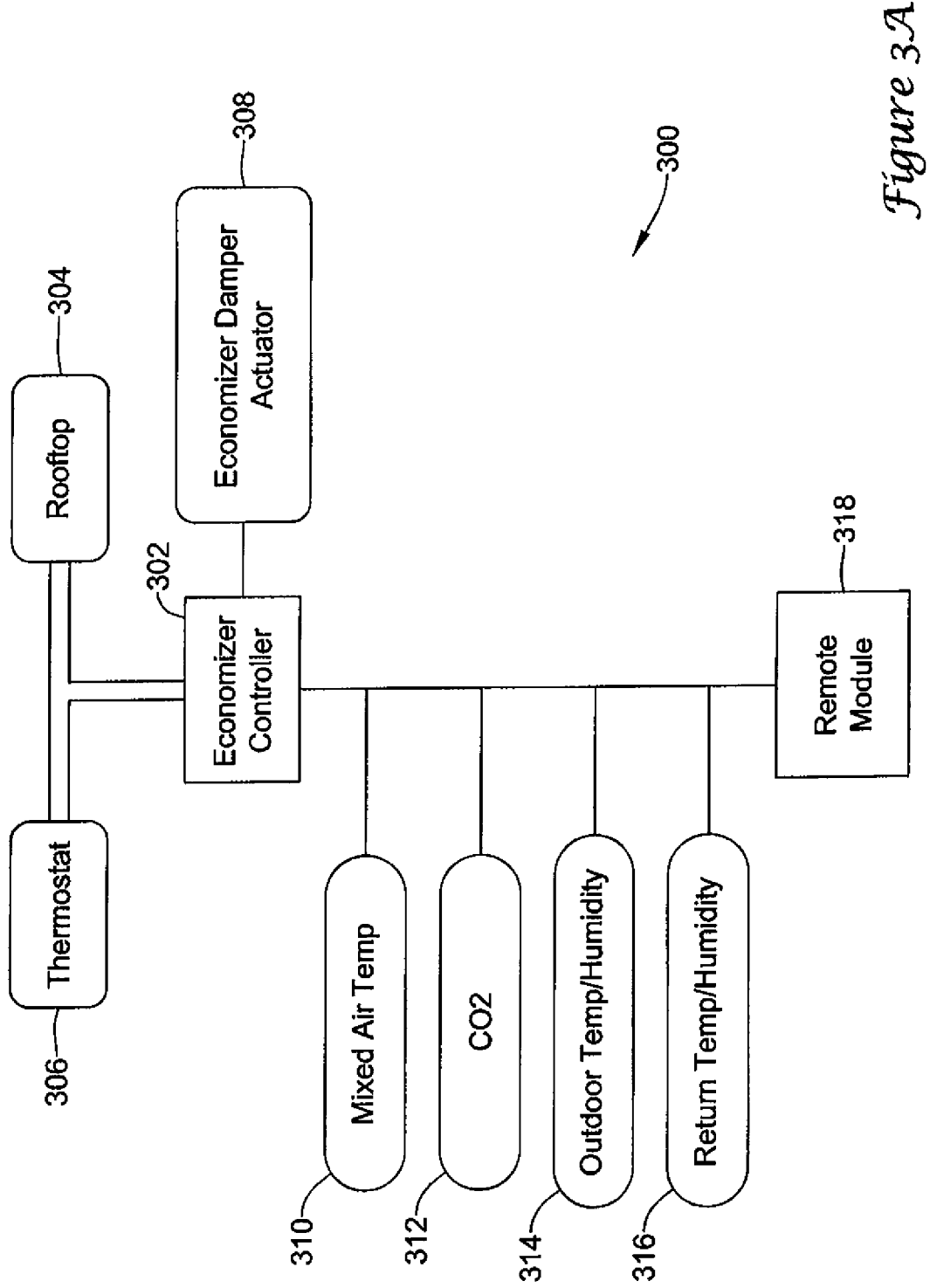
FIGS. 3A and 3B are block diagrams of an illustrative HVAC system utilizing DCV and/or economizing control.
Figure 3B:
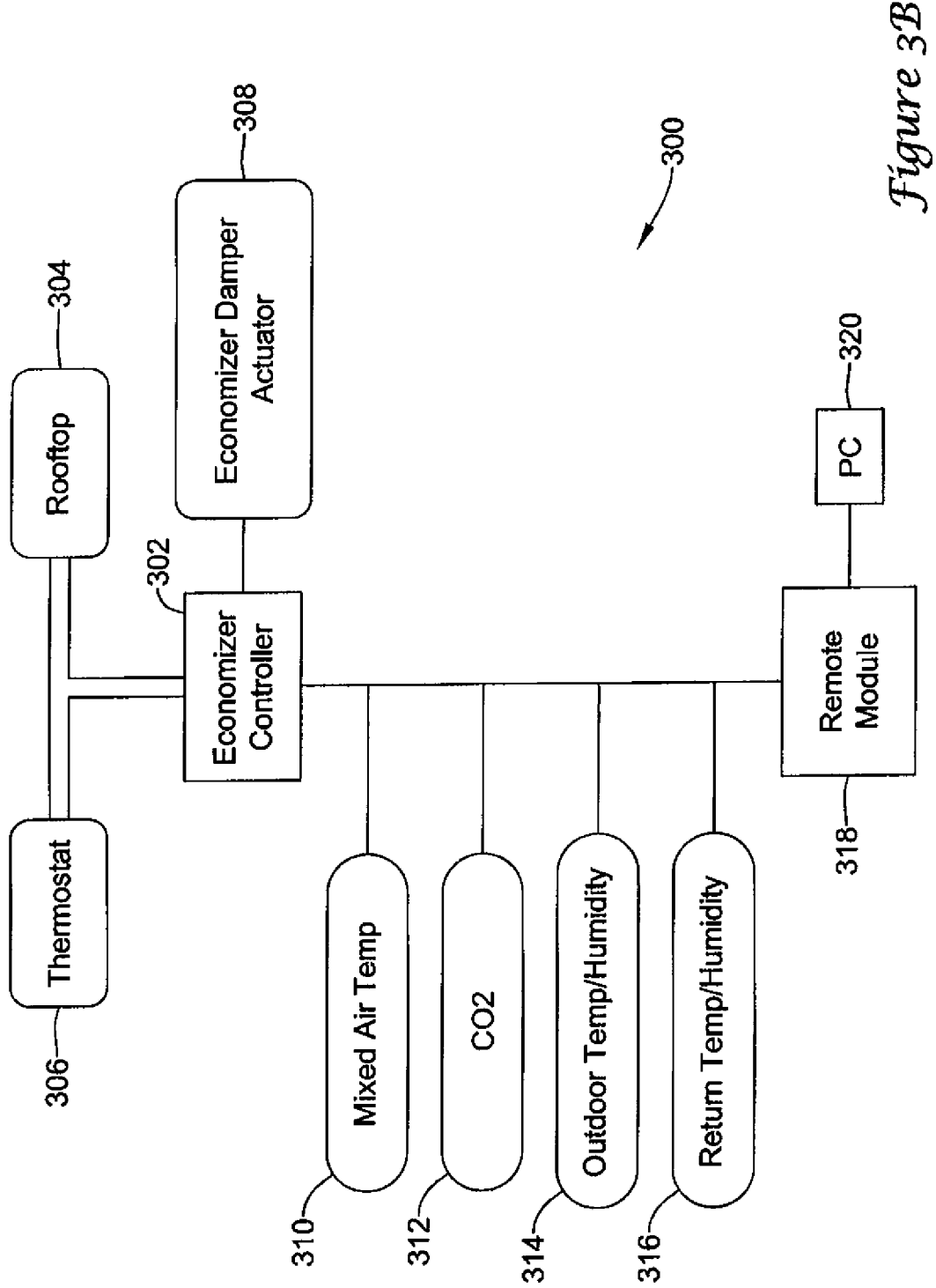

FIGS. 3A and 3B are block diagrams 300 illustrating how an illustrative DCV and/or economizer controller 302 may interact with the various components of the HVAC system 102. This is, however, just one example. In the example shown, a programmable controller, such as a thermostat 306, may be provided to control the HVAC unit(s) 106. The thermostat 306 may be in communication with the HVAC unit(s) 106, which in some instances may be rooftop unit(s) 304, however it is contemplated the HVAC unit(s) 106 may be located within the building or at some other location. The thermostat 306 may be configured to be programmable such that the building may be heated and/or cooled according to a desired schedule. In some instances, the thermostat 306 may communicate with the rooftop (or other) unit(s) 304 to turn the unit(s) 304 on and off as needed. In some embodiments, the thermostat 306 may be hardwired to the rooftop (or other) unit(s) 304 while in other embodiments, the thermostat 306 may be in wireless communication with the rooftop unit(s) 304.

The thermostat 306 may be part of or in communication with a DCV and/or economizer controller 302. As discussed above, DCV and/or economizer controller 302 may be programmed to control ventilation to the building 104 based, for example, on actual occupancy using carbon dioxide ($CO_2$) sensors. For example, in addition to operating the HVAC unit(s) to provide a desired temperature, the HVAC system 102 may also be configured to bring a certain amount of fresh ventilation into a building as set out in, for example, building codes. When DCV and/or Economizer controller 302 is so provided, DCV and/or Economizer controller 302 may communicate with damper actuator 308 to selectively open and close dampers based on the amount of ventilation needed. For example DCV and/or Economizer controller 302 may receive a signal from a $CO_2$ sensor 312. When the amount of $CO_2$ in the building reaches a threshold level, the DCV and/or Economizer controller 302 may relay a signal to the damper actuator 308 to open a damper (for example, damper 122 in FIG. 1) to provide more fresh air to the building. Likewise, when the amount of $CO_2$ in the building falls below a threshold level, the DCV and/or economizer controller 302 may relay a signal to the damper actuator 308 to close or partially close a damper (for example, damper 122 in FIG. 1) to minimize the amount of conditioned air that is lost to atmosphere. In some instances, the damper actuator 308 may include a direct coupled actuator (DCA) such that the controller 302 may communicate digitally with the actuator 308. DCV and/or economizer controller 302 may also receive signals from other sensors such mixed air temperature 310, outdoor air temperature and/or humidity 314, and return air temperature and/or humidity 316 sensors. These parameters may be used to determine, for example, whether or not the DCV and/or Economizer controller 302 will draw in outside air in amounts greater than those needed to meet Demand Control Ventilation requirements.

In some instances, the DCV and/or Economizer controller 302 may be in communication with a remote monitoring device 318, or may be incorporated into the remote monitoring device 318, but this is not required or even desired in all embodiments. In one illustrative example, remote monitoring device 318 may display operational parameters which may allow the user to monitor the HVAC system 102 remotely. For example, the remote monitoring device 318 may indicate that status of an HVAC unit (e.g. on/off), if free cooling (economizer mode) is available, DCV status (e.g. on/off), temperature/humidity readings from the various sensors, $CO_2$ levels (parts per million, ppm), fan speed (e.g. low/high), building occupancy, etc. The remote monitoring device 318 may be further configured to allow a user to input various parameters such as $CO_2$ threshold setpoints, temperature setpoints, percent of ventilation at high/low fan speeds, minimum and maximum calibration ventilation flow rates at one or more calibration damper positions—sometimes at various fan speeds, etc., to be provided to the DCV and/or economizer controller 302. The remote monitoring device 318 may be further configured to provide a user with system alerts and/or system faults. For example, the remote monitoring device may be able to alert the user to a malfunction within the rooftop unit 304 that the user may otherwise be unaware of. This may allow a user to maintain a DCV system/economizer 130 more effectively. The remote monitoring device 318 may be configured to provide an alert such as, but not limited to, an audible alarm, an indicator light, and/or display and/or send a message when a fault has been detected. The remote monitoring device 318 may be in communication with the controller 302 via a wired, wireless or any other suitable interface, as desired. It is contemplated that in some instances the DCV and/or economizer controller 302 may be capable of displaying operational parameters, receiving user inputs, and/or providing alerts.

As illustrated in FIG. 3B, in some instances, the remote monitoring device may be in communication with a computer 320, or other data logging system. Such a data logging system may allow a user to monitor the trends of the system 102, which might help a user more effectively program and/or operate the HVAC system 102. For example, the user may be able to retrieve historical system data such as when the system 102 was able to function in economize and/or demand control modes. This may help the user and/or the controller 302 to better predict necessary system maintenance or when calibration of the system might be warranted.

In one illustrative embodiment, and prior to operating controller 302, the system 102 may be calibrated based on a minimum and a maximum desired ventilation rate by, for example, changing the damper positions and/or changing a fan speed (e.g. of fan 119) between a low and a high setting. In some instances, the HVAC system 102 may be automatically calibrated from time to time, or in some cases, effectively continuously calibrated. As used herein, calibration may refer to, among other things, calibration of the system during initial installation of the system, or a re-calibration of the system during a subsequent system checkout (e.g. to help ensure proper functioning after the initial calibration). In some cases, the controller 302 may be calibrated at both a maximum fan speed and a minimum fan speed, for both a code mandated ventilation rate required for the building 104 during maximum occupancy (hereinafter Vbz) and for a code mandated minimum ventilation rate required for building material out-gassing (hereinafter Va).

The calibration/commissioning process may include calibrating minimum (Va) and maximum (Vbz) damper position settings based on desired minimum and maximum ventilation rates. These damper settings are sometimes called out in the HVAC system design documents for the building supplied by an engineering firm that designed the system, and may be expressed as a percentage of ventilation (or percentage of fresh air in the mixed air stream). To help program the system's 102 minimum and maximum ventilation rates, temporary or permanent calibration sensors may be placed at the outside air intake 108, the return air duct 112 and/or at the mixed air duct 132. In one example, temperature may be used to measure ventilation rate. In some cases, a minimum differential of 10 degrees Fahrenheit is desired between the return air temperature (RAT) and the outdoor air temperature (OAT) to conduct a calibration. Once this condition is met, the following readings may be collected, and the readings may be used as inputs to Equation 1 below:

$$(OAT-RAT) \times \% \text{ Ventilation} + RAT = MAT \quad \{\text{Equation 1}\}$$

where OAT=Outside air temperature, RAT=Return air temperature, and MAT=Mixed air temperature. During the calibration, the outdoor and/or return air dampers may be repositioned by the controller until the correct ventilation percentage (% Ventilation) is achieved for each minimum and maximum ventilation settings. The controller 302 may then be programmed to interpolate an intermediate ventilation rate, depending on actual, sensed or scheduled occupancy, by modulating between these two calibrated damper positions (or extrapolating beyond the values). This calibration may be performed for each fan speed of fan 119 of the HVAC system 102.

In some cases, the controller 302 may be programmed to use a mixed air temperature sensor to determine a return air temperature and/or an outside air temperature. In one example, and to determine the fresh air temperature, the controller 302 may close return air damper 124 and open fresh air damper 122 (see FIG. 1). Under these conditions, the mixed air stream will be mostly fresh outside air, and thus once stabilized, the mixed air temperature sensor 144 will sense the temperature of the fresh outside air. Likewise, to determine the return air temperature, the controller 302 may close fresh air damper 122 and open return air damper 124 (see FIG. 1). Under these conditions, the mixed air stream will be mostly return air, and thus once stabilized, the mixed air temperature sensor 144 will sense the temperature of the return air. This procedure may be used by the controller 302 to help determine the return air temperature and/or the outside air temperature when no return air temperature sensor and/or outside air temperature sensor are provided, or have failed.

In some instances, it may be desirable for a technician commissioning the system 130, an original equipment manufacturer (OEM), and/or an installer to test the DVC and/or Economizer 130 upon installation, system start-up, or on-demand, as desired. In some illustrative embodiments, the DCV and/or Econonizer system 130 may be configured to perform system checks to help verify that the system was commissioned correctly and is/was functioning properly. In some cases, the DCV and/or Economizer system may include a controller that provides support for some level of self-testing including, for example, proving that one or more dampers move to certain open and closed positions under certain conditions, proving that one or more sensors are functioning properly, proving that one or more fans (if present) can be energized properly, and/or perform any other suitable self-test function, and provide confirmation to the user. In some instances, the settings used during the commissioning process of the DCV and/or Economizer system 130 (either in the factory or in the field) may be stored in a memory, such as memory 222 of the controller, where they can be later downloaded to verify that the particular DCV and/or Economizer system 130 was set up correctly.

In some instances, it may be desirable to be able to verify damper moves

In some embodiments, the a controller 302 may be configured such that a user can test one or more of the DCV and/or Economizer 130 functions (e.g. damper moves, mechanical cooling, etc.) through a user interface (e.g. a user interface 216), through one or more physical terminal(s), through a wireless interface (e.g. a wireless interface 214), or through any other suitable interface, as desired. In one example, the user may be able to link a portable device such as, but not limited to, a laptop computer, a personal digital assistant (PDA), or a cellular phone (smart phone), directly to the controller 302 to initiate one or more system tests. In some embodiments, the controller 302 may provide audio and/or visual feedback (e.g. beeps and/or LEDs) to the user to help verify that the system 130 was commissioned properly and/or is functioning properly. Additionally, or alternatively, the controller 302 may provide audio and/or visual feedback to indicate the system is not functioning properly or that an error has occurred. In some instances, the controller 302 may provide additional feedback, such as the set damper positions, and/or other system control parameters. In some instances, the controller 302 may be configured to perform a system self-test upon system start-up. Alternatively, or in addition, the controller 302 may be configured to perform a system self-test on demand, or at a user's prompting. A result of the self-tests may be output to a user via a user interface and/or stored in a memory for later viewing.

In some instances, the controller 302 may include a test mode, wherein in the test mode, a user can independently control various aspects of the CV and/or Economizer 130 system, such as damper position, mechanical cooling mode, fan operation, etc.

In some instances, the controller 302 may be configured to provide feedback, including such things as setup operating parameters provided during a commissioning process, through a communication link to a portable device such as, but not limited to a personal digital assistant (PDA), a cellular phone (smart phone), or a laptop computer. In other instances, the controller 302 may be configured to wirelessly communicate with a remote monitoring device and/or thermostat. In yet other instances, the controller 302 may communicate such parameters with a local user interface that is local to the DCV and/or Economizer 130 system (e.g. on the roof top).

The controller 302 may be further configured to store data and settings compiled during the commissioning of the stem, for verification of proper commissioning of the system. For example, in some instances, the controller 302 may be configured to store current set and reset damper positions, a maximum and/or minimum damper position, air flow parameters, the date of commissioning, a person or company name that performed the commissioning, and/or other DCV and/or economizer parameters. This information may be accessed at a later date by, for example, a building owner or utility representative to verify the DCV and/or economizer system 130 was properly commissioned and is/was functioning. It is contemplated that this information may be transferred to a device used to initiate the system test and/or commissioning. In some instances, the OEM (Original Equipment Manufacturer) may perform some system checks and/or commissioning of the economizer 130 (or other equipment) before shipment, to help ensure that the equipment will meet the desired specifications. The OEMs may store these system checks and/or commissioning parameters in a memory, such as a non-volatile memory in a controller 302, which may help certify that the economizer 130 was in fact commissioned and/or functioning properly prior to shipment. The OEM may be able to retrieve the data from the controller 302 and maintain the information within their own records for later access. In some instances, the DCV and/or economizer 130 may be added or retrofitted to an existing rooftop unit (or other system). When so provided, the commissioning data obtained during the installation of the DCV and/or economizer system 130 may be recorded by the installer in a memory such that the data can be subsequently recalled to help verify that the system 130 was correctly commissioned and installed.

Figure 4:
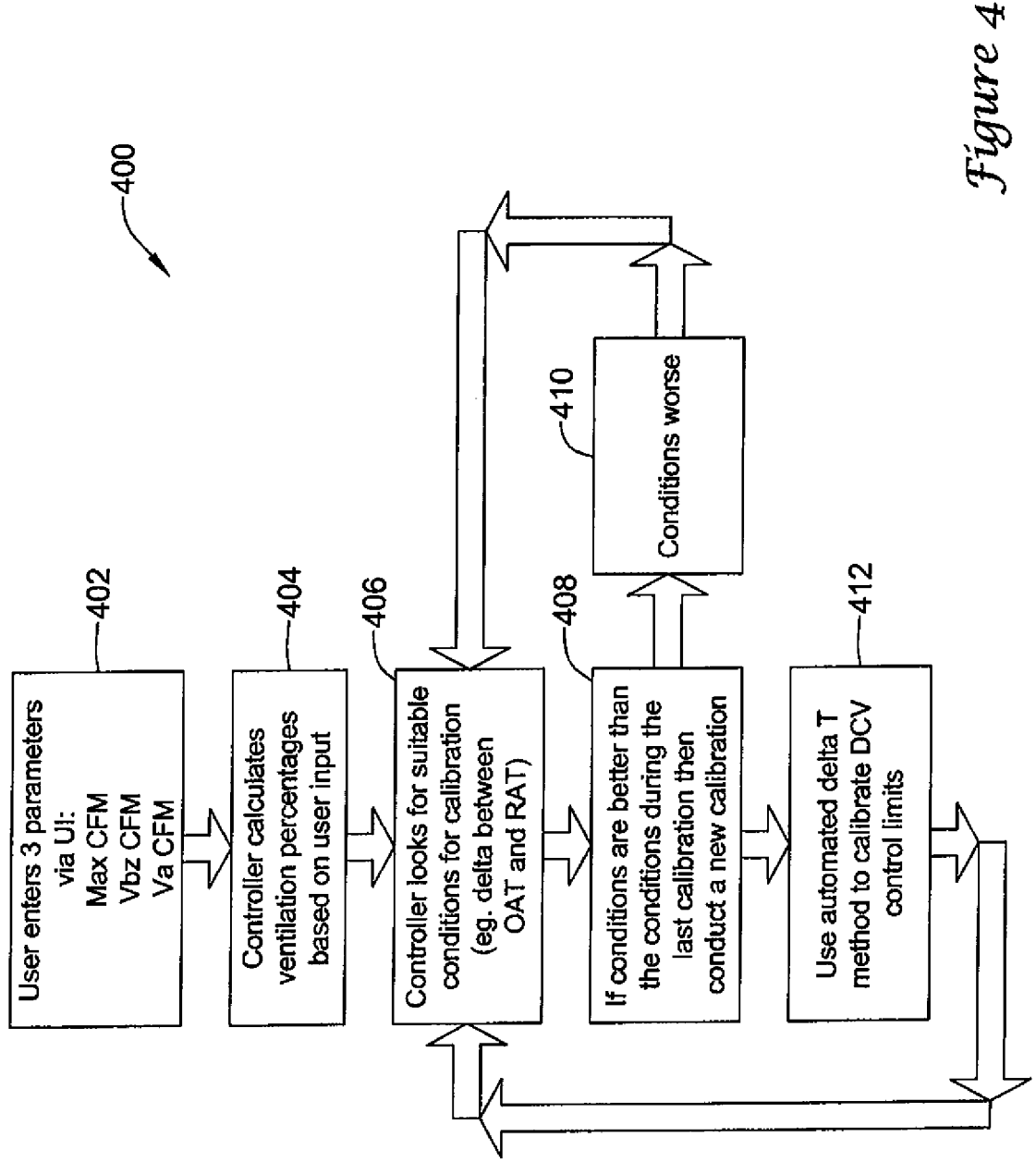
FIG. 4 is a block diagram of an illustrative damper calibration method.

In some instances, it may be desirable for the controller 302 to automatically calibrate the DCV and/or economizer system 130, but this is not required. FIG. 4 is a flowchart of an illustrative method 400 for automatically calibrating a DCV and/or economizer system 130. A user may input parameters into controller 302 relating to the ventilation requirements 402 of the particular system 102/building 104. The user may enter the parameters via a user interface (UI), sometimes directly coupled to the controller 302, or into a remote user interface, such as remote monitoring device 318. For example, the user may enter the maximum ventilation rate the system is capable of providing (e.g. in cubic feet per minute, CFM), the code mandated ventilation rate required for the building 104 during maximum occupancy, Vbz, and the code mandated minimum ventilation rate required for building material out-gassing, Va. In some cases, default values are provided for each of these parameters.

Based on the parameters, the controller 302 may calculate the ventilation percentages 404 for Vbz and Va. The controller 302 may then monitor the signals from outdoor temperature sensor 314 and return air temperature sensor 316 for suitable conditions for calibration, as shown at block 406. For example, the controller 302 may monitor the temperature difference between the outdoor air and the return air for a differential of at least 10 degrees Fahrenheit. Once such a condition is detected, and in some cases, the controller 302 may compare the current conditions to the conditions during the previous calibration 408. If the current conditions are better than the conditions during the previous calibration (e.g. a larger temperature differential), the controller 302 may automatically recalibrate 412 the system 130 based on the current conditions. If the current conditions are worse than the conditions during the previous calibration (e.g. a smaller temperature differential), the controller 302 may do nothing 410 and continue monitoring the temperature sensors 314, 316 for more ideal conditions for calibration at block 406.

In some embodiments, the controller 302 may automatically calibrate the DCV and/or economizer system 130 from time to time. When so provided, the DCV and/or economizer system 130 may continually optimize itself for changing environmental and/or equipment conditions. In some instances, the controller 302 may be caused, either during system boot-up or in a test or calibration mode, to perform a complete system checkout in order to help ensure that the HVAC system 102 is functioning properly.

Figure 5A:
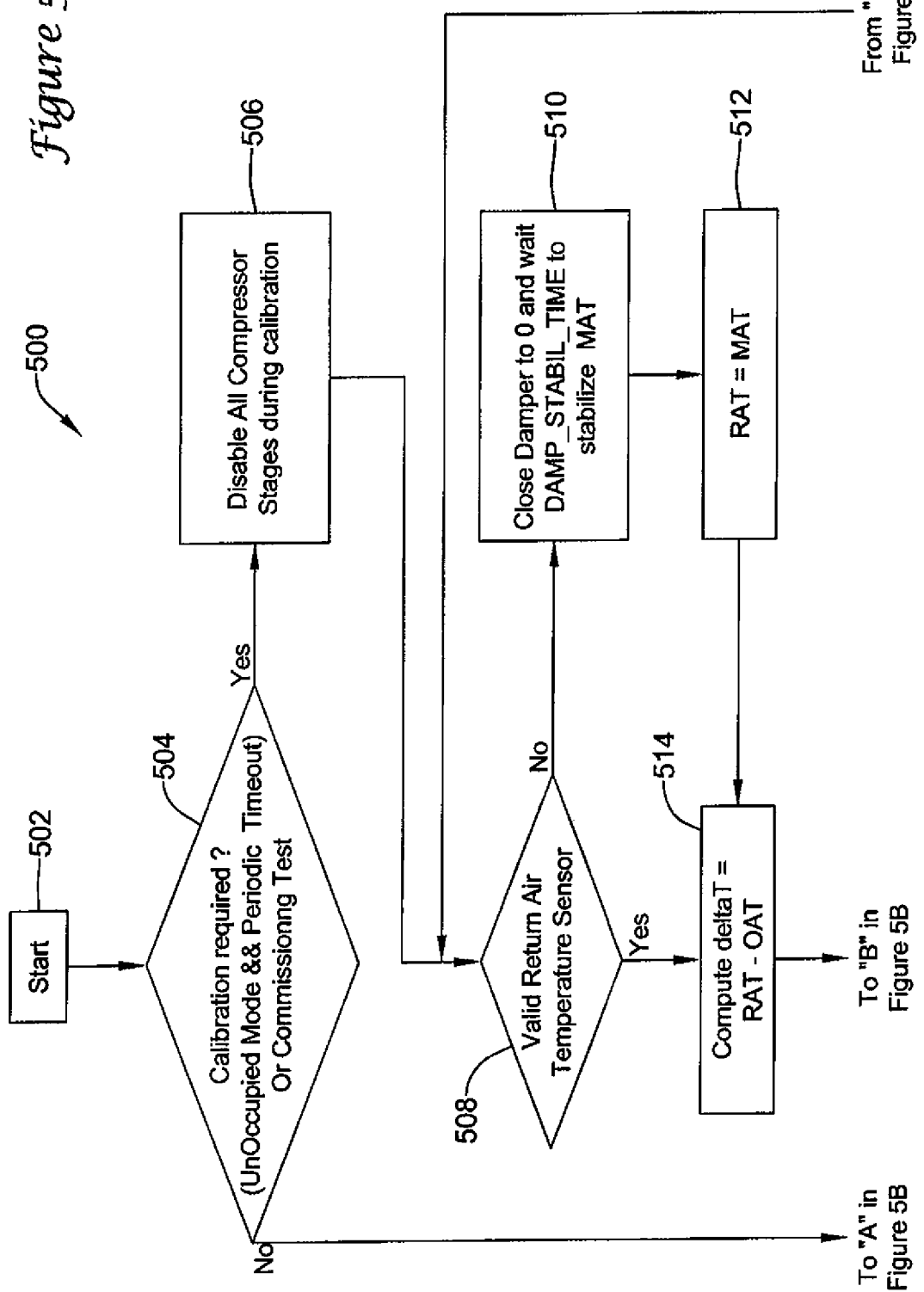
FIGS. 5A-5D show a block diagram of another illustrative damper calibration method.
Figure 5B:
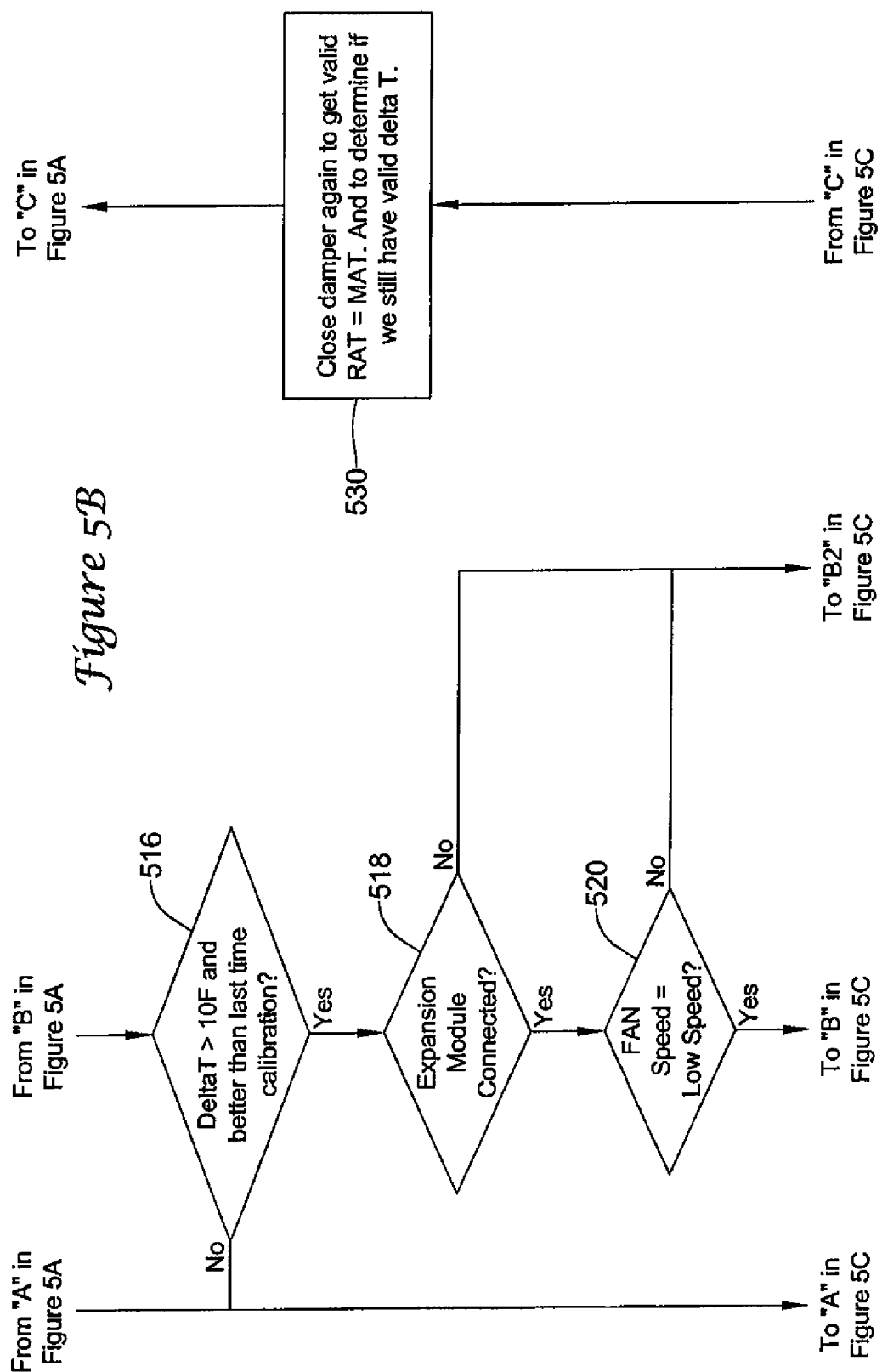
Figure 5C:
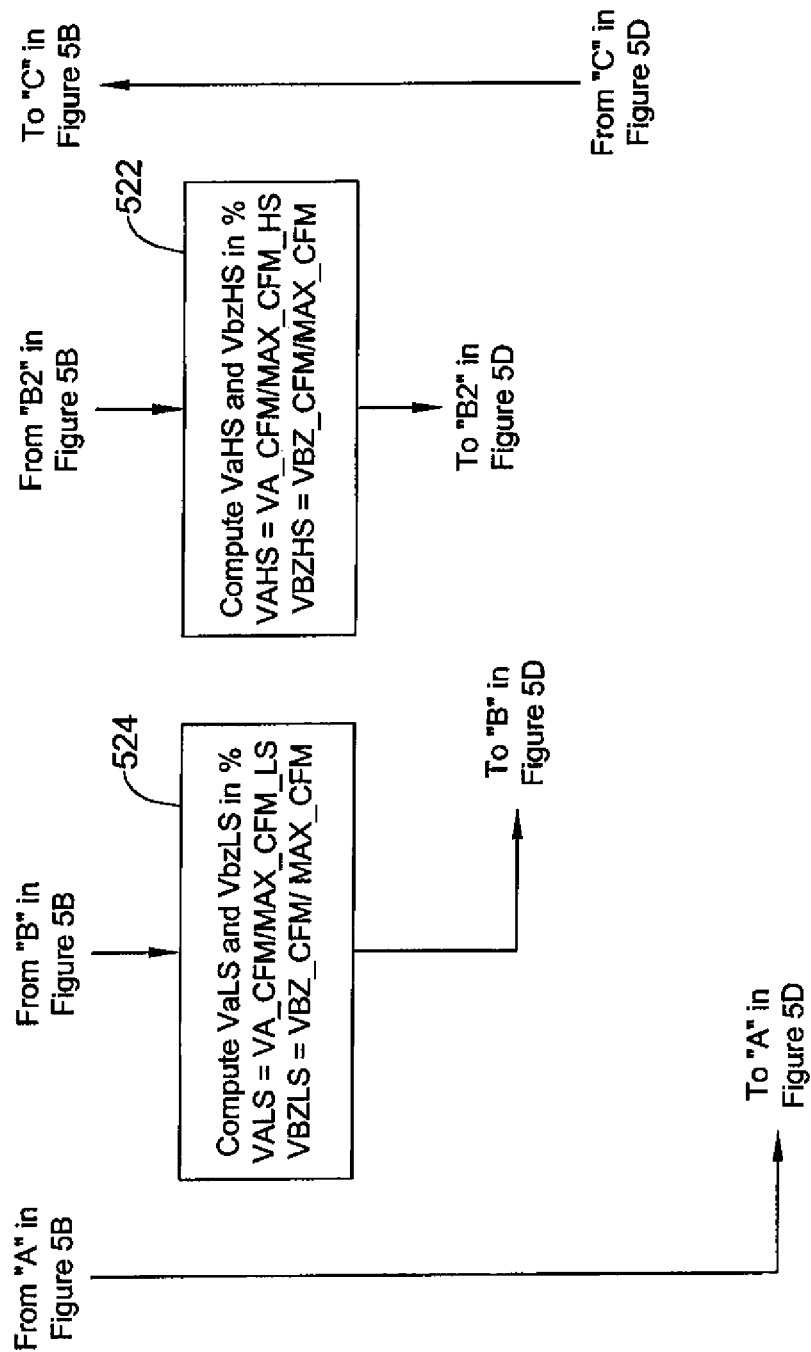
Figure 5D:
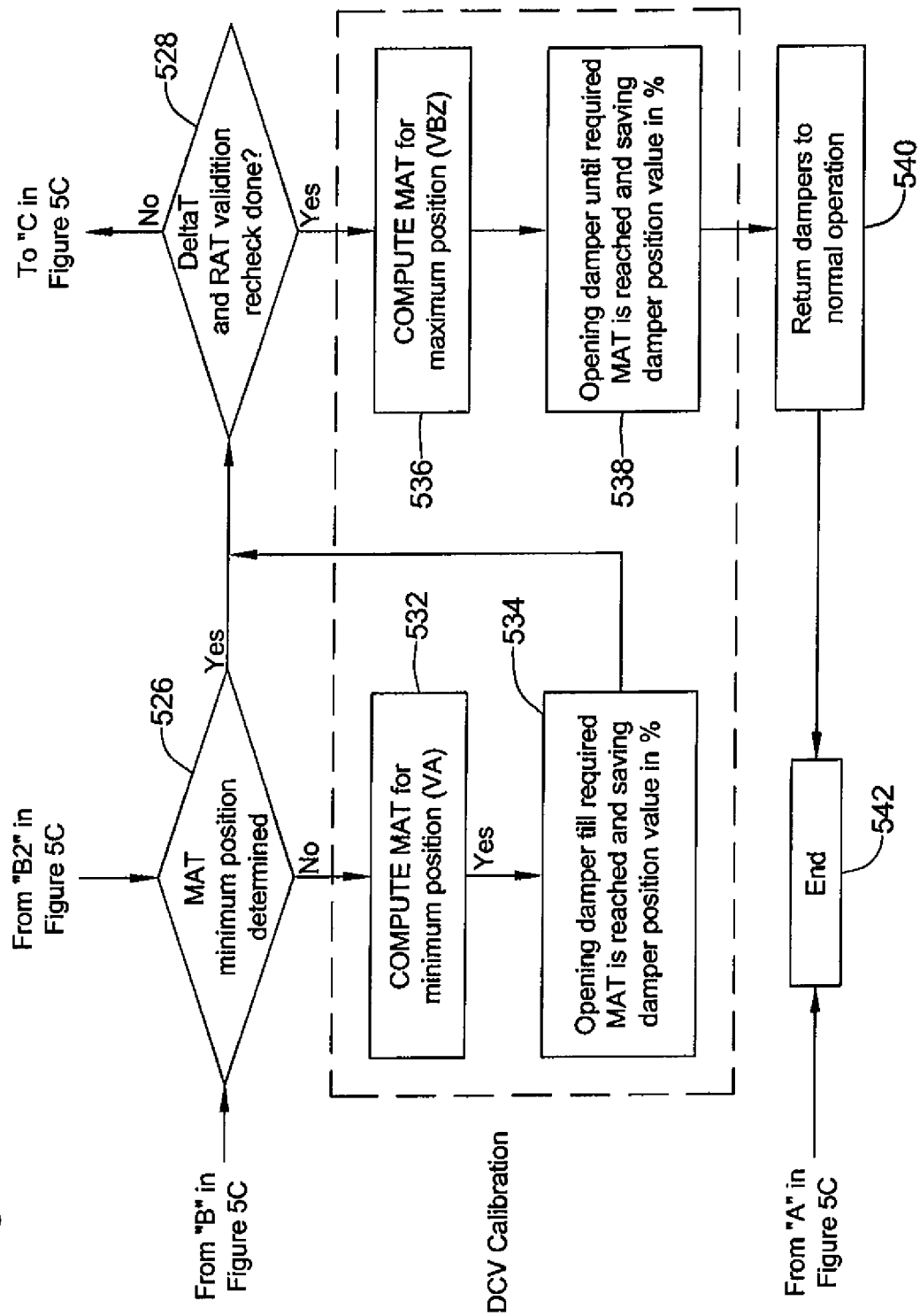

FIGS. 5A-5D, in combination, show a flowchart of another illustrative method for calibrating the damper positions. In some cases, the damper positions may be calibrated during the initial installation of the HVAC system 102, and/or automatically from time to time during normal system operation. Referring to FIG. 5A, the damper calibration process 500 may begin 502 during, for example, an initial system set-up, during an automatic calibration process, and/or at user prompting (e.g. the user activates a calibration mode in the controller 302). In some embodiments, the DCV and/or economizer controller 302 may continually monitor the environmental conditions, and when the environmental conditions are suitable for a recalibration, the controller 302 may run a calibration algorithm.

Referring to block 504, the controller 302 may first determine if the DCV and/or economizer system 130 requires calibration 504. If not, the controller 302 does nothing and the damper calibration process is ended at block 542. If it is determined that the DCV and/or economizer system 130 requires calibration, and in some illustrative embodiments, the controller 302 may disable all compressor stages 506 for the duration of the calibration process. The controller 302 may then check the return air temperature sensor 508 for a valid return air temperature reading. Next, controller 302 may determine the temperature differential 314 between the return air temperature and the outdoor air temperature. In order for the illustrative damper calibration process 500 to continue 516, the temperature differential must meet the requirements (e.g. greater than 10° F.), and the current conditions must be better than the conditions under which the previous calibration occurred. If either of these is not true, the controller 302 does nothing and the damper calibration process is ended at block 542.

If the current conditions meet the requirements 516, the controller 302 may check for an optional expansion module 518. In some instances, an optional expansion module 518 may provide extended input/output capabilities to the controller. For example, an expansion module 518 may allow for multiple fan speeds (for example, but not limited to, high and low fan speeds). If an expansion module 518 is present, the controller 302 may then check the fan speed 520 of the HVAC system 102. If the fan speed is set to low, the controller 302 may compute the percent of ventilation necessary 524 for both Va and Vbz at low fan speed (VaLS and VbzLS, respectively). The percent of ventilation at low fan speed may be calculated by the following equations:

$$VaLS = Va\_CFM/MAX\_CFM\_LS \quad \{\text{Equation 2}\}$$

$$VbzLS = Vbz\_CFM/MAX\_CFM\_LS \quad \{\text{Equation 3}\}$$

where VaLS is the percent of ventilation for minimum building occupancy at low fan speed, Va_CFM is the volume (in cubic feet per minute) of air flow needed to meet the minimum ventilation requirements, VbzLS is the percent of ventilation for maximum building occupancy at low fan speed, Va_CFM is the volume (in cubic feet per minute) of air flow needed to meet the maximum ventilation requirements, and MAX_CFM_LS is the maximum amount of air volume (in cubic feet per minute) the fan can provide at low fan speed.

If the fan speed is not low, or an expansion module 518 is not connected, the controller 302 may compute the percent of ventilation necessary 522 for both Va and Vbz at high fan speed (VaHS and VbzHS, respectively). The percent of ventilation at high fan speed may be calculated by the following equations:

$$VaHS = Va\_CFM/MAX\_CFM\_HS \quad \{\text{Equation 4}\}$$

$$VbzHS = Vbz\_CFM/MAX\_CFM\_HS \quad \{\text{Equation 5}\}$$

where VaHS is the percent of ventilation for minimum building occupancy at high fan speed, Va_CFM is the volume (in cubic feet per minute) of air flow needed to meet the minimum ventilation requirements, VbzHS is the percent of ventilation for maximum building occupancy at high fan speed, Va_CFM is the volume (in cubic feet per minute) of air flow needed to meet the maximum ventilation requirements, and MAX_CFM_HS is the maximum amount of air volume (in cubic feet per minute) the fan can provide at high fan speed.

Once the percent of ventilation for Va and Vbz has been determined, the controller 302 may check if the minimum damper positions have been determined at block 526 to achieve the desired mixed air temperature (MAT) for Va. If the damper positions have not been determined, the controller 302 may compute 532 the mixed air temperature for Va given the sensed return air temperature, outside air temperature and the desired percent of ventilation Va. The controller 302 may then adjust the intake and/or exhaust dampers 122, 120 until the required MAT has been reached, as indicated at block 534. The corresponding damper position may be saved within a memory of the controller 302.

Once the damper position has been determined for Va, the controller 302 may determine if a validation recheck 528 of the return air temperature and temperature differential (RAT−OAT) has been performed. In some instances, the damper calibration process 500 may be iterative such that the calibration process 500 is cycled through until the damper position has been determined for both Va and Vbz at a high fan speed and a low fan speed (if available). In some instances, the damper positions for Va may already be determined when the controller 302 arrives at the decision block 526 for Va damper position. In this instance, the controller may not determine the damper position, but instead may check if a validation recheck 528 of the return air temperature and temperature differential (RAT−OAT) has been performed in order to help ensure that the calibration has been completed under suitable conditions. If a recheck 528 has not been performed, the dampers 120, 122 may be closed and the conditions may be verified by beginning the temperature sensor checks 508 again. In some embodiments, the calibration of the damper positions 532, 534, 436, 538 may be performed with an Adaptive Intelligent Action (AIA) function block.

If the recheck 528 has been performed, the controller 302 may compute 536 the mixed air temperature for Vbz. The intake damper 122 may be opened at shown at block 538 until the required MAT has been reached. The corresponding damper positioned may be saved within a memory of the controller 302. Once the damper position has been determined for Vbz, the controller 302 may return control of the dampers for normal system operation 540, at which point the calibration process 500 is complete as shown at block 542. As discussed above, the calibration process 500 may be performed at, for example, system boot up, at a predetermined frequency, upon user initiation through a test and calibration mode, and or at any other suitable time as desired.

Those skilled in the art will recognize that the present invention may be manifested in a variety of forms other than the specific embodiments described and contemplated herein. Accordingly, departure in form and detail may be made without departing from the scope and spirit of the present invention as described in the appended claims.

What is claimed is:

1. A Demand Control Ventilation (DCV) and/or Economizer unit for a building, comprising:
    a damper for controlling a flow of outside air into the building;
    a controller configured to control a position of the damper such that a desired air flow of outside air is drawn into the building; and
    a non-volatile memory, wherein the non-volatile memory stores system commission data generated during an original commissioning of the DCV and/or economizer unit for later confirmation that the DCV and/or economizer unit was originally set up correctly, the system commissioning data comprising an identifier for a person and/or a company that performed the commissioning.

2. The Demand Control Ventilation (DCV) and/or Economizer unit of claim 1, wherein the system commissioning data further comprises a date of original commissioning.

3. The Demand Control Ventilation (DCV) and/or Economizer unit of claim 1, wherein the system commissioning data further comprises one or more settings that were set during the original commissioning of the DCV and/or economizer unit.

4. The Demand Control Ventilation (DCV) and/or Economizer unit of claim 3, wherein the one or more settings comprise one or more of a minimum damper position and a maximum damper position.

5. The Demand Control Ventilation (DCV) and/or Economizer unit of claim 1, wherein the system commissioning data further comprises one or more verification identifiers, wherein at least one of the verification identifiers indicates that one or more damper moves were successfully accomplished during the original commissioning of the DCV and/or economizer unit.

6. The Demand Control Ventilation (DCV) and/or Economizer unit of claim 1, wherein the non-volatile memory is part of the controller.

7. The Demand Control Ventilation (DCV) and/or Economizer unit of claim 1, wherein the controller is operatively coupled to the non-volatile memory and is configured to write the system commissioning data to the non-volatile memory.

8. The Demand Control Ventilation (DCV) and/or Economizer unit of claim 1, wherein the controller is operatively coupled to the non-volatile memory and is configured to read the system commissioning data from the non-volatile memory and send the system commissioning data to a user via a user interface to allow the user to confirm the original commissioning of the DCV and/or economizer unit.

9. A Demand Control Ventilation (DCV) and/or Economizer unit for a building, comprising:
    a damper for controlling a flow of outside air into the building;
    a controller configured to control a position of the damper such that a desired air flow of outside air is drawn into the building; and a non-volatile memory, wherein the non-volatile memory stores system commissioning data generated during an original commissioning of the DCV and/or economizer unit in a manner that can be subsequently used to verify whether the DCV and/or economizer unit was setup and functioning correctly at the time of original installation, the system commissioning data comprising one or more settings that were set during the original commissioning of the DCV and/or economizer unit, wherein the one or more settings comprise one or more of a minimum damper position, a maximum damper position, a minimum ventilation rate, and a maximum ventilation rate.

10. The Demand Control Ventilation (DCV) and/or Economizer unit of claim 9, wherein the one or more settings comprise one or more of a minimum damper position and a maximum damper position.

11. The Demand Control Ventilation (DCV) and/or Economizer unit of claim 9, wherein the one or more settings comprise one or more of a minimum ventilation rate and a maximum ventilation rate.

12. The Demand Control Ventilation (DCV) and/or Economizer unit of claim 9, wherein the system commissioning data further comprises one or more verification identifiers, wherein at least one of the verification identifiers indicates that one or more damper moves were successfully accomplished during commissioning of the DCV and/or economizer unit.

13. A Demand Control Ventilation (DCV) and/or Economizer system for a building, the Demand Control Ventilation (DCV) and/or Economizer system comprising:
  a damper for controlling a flow of outside air into the building; and
  a controller operatively coupled to the damper, the controller configured to:
    control a position of the damper such that a desired flow of outside air is drawn into the building based at least in part on one or more sensed values;
    when a fault in the Demand Control Ventilation (DCV) and/or Economizer system occurs, automatically detect the fault and provide an alert; and
  a non-volatile memory operatively coupled to the controller, wherein the non-volatile memory stores system commission data generated during an original commissioning of the DCV and/or Economizer system for later confirmation that the DCV and/or Economizer system was originally set up correctly, the system commissioning data comprising an identifier for a person and/or a company that performed the commissioning.

14. The Demand Control Ventilation (DCV) and/or Economizer system of claim 13, wherein the one or more sensed values are provided by one or more sensors, and wherein the controller is configured to automatically initiate one or more self-tests from time to time to detect the fault, wherein the one or more-self tests comprise a self-test for testing whether one or more of the sensors are functioning properly.

15. The Demand Control Ventilation (DCV) and/or Economizer system of claim 13 further comprising one or more fans, wherein the controller is configured to automatically initiate one or more self-tests from time to time to detect the fault, wherein the one or more-self tests comprise a self-test for testing whether one or more of the fans are functioning properly.

16. The Demand Control Ventilation (DCV) and/or Economizer system of claim 13, a wherein the controller is configured to store an indication of the detected fault in the non-volatile memory.

17. The Demand Control Ventilation (DCV) and/or Economizer system of claim 13, wherein providing the alert comprises providing a visual and/or audible alert via a local user interface.

18. The Demand Control Ventilation (DCV) and/or Economizer system of claim 13, wherein providing the alert comprises sending an alert message to a remote monitoring device.

19. The Demand Control Ventilation (DCV) and/or Economizer system of claim 18, wherein the remote monitoring device comprises one or more of a server, a smartphone and a laptop.

20. The Demand Control Ventilation (DCV) and/or Economizer system of claim 13, wherein the controller is configured to automatically initiate one or more self-tests from time to time to detect the fault, wherein the one or more-self tests comprise a self-test for testing whether the damper can move to a certain open and/or a certain closed position.

* * * * *